US009179031B2

(12) United States Patent
Kon et al.

(10) Patent No.: US 9,179,031 B2
(45) Date of Patent: Nov. 3, 2015

(54) CONTENT ACQUISITION APPARATUS AND STORAGE MEDIUM

(71) Applicant: SONY CORPORATION, Tokyo (JP)

(72) Inventors: Takayasu Kon, Tokyo (JP); Yoichiro Sako, Tokyo (JP); Kazunori Hayashi, Tokyo (JP); Yasunori Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 14/045,283

(22) Filed: Oct. 3, 2013

(65) Prior Publication Data

US 2014/0111668 A1     Apr. 24, 2014

(30) Foreign Application Priority Data

Oct. 23, 2012  (JP) ................................ 2012-233708

(51) Int. Cl.
```
H04N 1/21       (2006.01)
H04N 5/77       (2006.01)
H04N 21/4223    (2011.01)
H04N 21/433     (2011.01)
H04N 21/44      (2011.01)
H04N 21/845     (2011.01)
G11B 27/031     (2006.01)
G11B 27/28      (2006.01)
G11B 27/34      (2006.01)
H04N 5/232      (2006.01)
```

(52) U.S. Cl.
CPC ............ *H04N 1/2112* (2013.01); *G11B 27/031* (2013.01); *G11B 27/28* (2013.01); *G11B 27/34* (2013.01); *H04N 5/772* (2013.01); *H04N 21/4223* (2013.01); *H04N 21/4334* (2013.01); *H04N 21/44008* (2013.01); *H04N 21/8455* (2013.01); *H04N 5/232* (2013.01)

(58) Field of Classification Search
CPC ............ H04N 1/2112; H04N 5/23219; G06K 9/00335
See application file for complete search history.

(56) References Cited

U.S. PATENT DOCUMENTS

| 6,067,112    | A  * | 5/2000  | Wellner et al. ............. 348/211.4 |
| 6,563,532    | B1 * | 5/2003  | Strub et al. ................... 348/158 |
| 7,995,106    | B2 * | 8/2011  | Oishi .......................... 348/222.1 |
| 8,325,234    | B2 * | 12/2012 | Kii ................................ 348/161 |
| 8,558,759    | B1 * | 10/2013 | Prada Gomez et al. ........... 345/7 |
| 8,564,681    | B2 * | 10/2013 | Yamamoto ................. 348/222.1 |
| 2006/0262188 | A1 * | 11/2006 | Elyada et al. ................. 348/143 |

(Continued)

FOREIGN PATENT DOCUMENTS

| JP | 11-183996   | 7/1999 |
| JP | 2007-082088 | 3/2007 |
| JP | 2009-094585 | 4/2009 |

*Primary Examiner* — Nicholas Giles
(74) *Attorney, Agent, or Firm* — Paratus Law Group, PLLC

(57) ABSTRACT

There is provided a content acquisition apparatus including an acquisition unit configured to acquire content, a recognition unit configured to recognize at least two types of bookmark instructions when the acquisition unit acquires the content, and a control unit configured to, when the recognition unit recognizes a first bookmark instruction, provide a bookmark to the content acquired by the acquisition unit at corresponding time as a bookmarker at time of reproducing the content, and when the recognition unit recognizes a second bookmark instruction, provide the bookmark to the content acquired by the acquisition unit at corresponding time and switch an operation mode of the acquisition unit.

15 Claims, 10 Drawing Sheets

(56) References Cited

U.S. PATENT DOCUMENTS

| | | | |
|---|---|---|---|
| 2009/0096909 A1* | 4/2009 | Yamashita | 348/333.01 |
| 2010/0199232 A1* | 8/2010 | Mistry et al. | 715/863 |
| 2012/0263430 A1* | 10/2012 | Spitzer-Williams | 386/224 |
| 2013/0021491 A1* | 1/2013 | Lee et al. | 348/222.1 |
| 2013/0211843 A1* | 8/2013 | Clarkson | 704/275 |

\* cited by examiner

FIG. 3
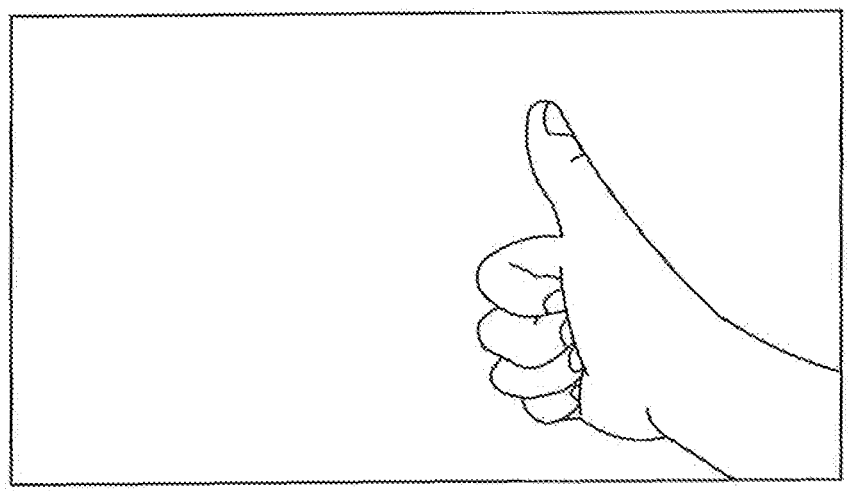
(1)
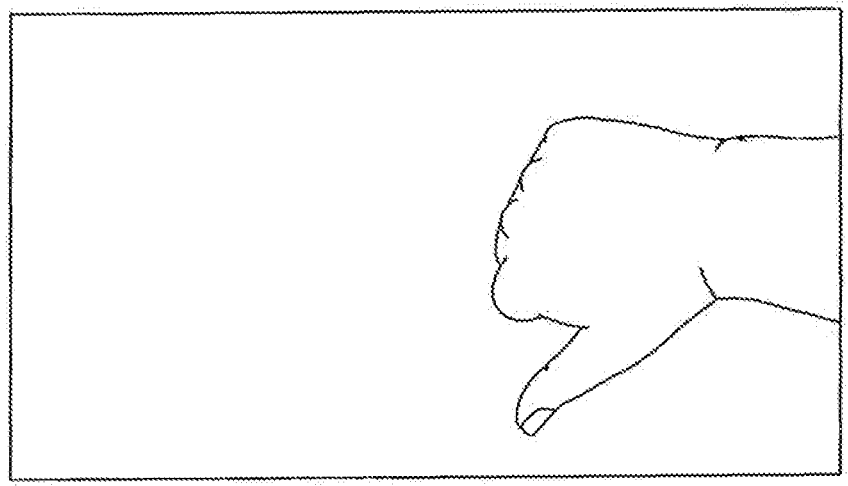
(2)

FIG. 4

| AUTOMATIC RECOGNITION CONDITIONS | PERFORM MARKING PROCESS OR NOT? | ATTRIBUTES ||||||
|---|---|---|---|---|---|---|---|
| | | AFFIRMATIVE/NEGATIVE ||| FROM HERE/UP TO HERE ||| |
| | | AFFIRMATIVE | NORMAL | NEGATIVE | FROM HERE | UP TO HERE | ⋮ |
| SUDDEN CHANGE IN ACCELERATION | × | – | – | ○ | – | – | |
| SUDDEN CHANGE IN SOUND VOLUME | ○ | – | – | ○ | ○ | – | |
| DETECTION OF SMILING FACE | ○ | ○ | – | – | ○ | – | |
| POSITIONAL INFORMATION | ○ | ○ | – | – | ○ | – | |
| DETECTION OF CHANGE IN LUMINANCE | × | – | ○ | – | – | – | |

230

CONTENT ACQUISITION APPARATUS AND STORAGE MEDIUM

CROSS REFERENCE TO RELATED APPLICATIONS

This application claims the benefit of Japanese Priority Patent Application JP 2012-233708 filed Oct. 23, 2012, the entire content of which is incorporated herein by reference.

BACKGROUND

The present disclosure relates to a content acquisition apparatus and a storage medium.

In recent years, a field called a lifelog has been gaining attention. The lifelog means recording every action in a day. As an example, a lifelog camera has been known that is worn by a user and keeps on automatically shooting the surroundings. The lifelog camera can record every action of a user in a day in the form of video, an image, sounds, and the like. Accordingly, the user can reproduce and enjoy the recorded data.

A vast quantity of data is recorded by a lifelog camera. A technique is therefore necessary for efficiently searching for a specific scene in reproducing the data.

In response to such necessity, JP H11-183996A discloses a technique for reproducing an image on the basis of where a camera was positioned at the time of shooting.

JP 2009-094585A also discloses a technique for weighting (marking) video on the basis of camera setting information including a zoom position and a focus distance at the time of shooting, and thereafter reproducing the marked video.

JP 2007-082088A further discloses a technique for marking video on the basis of camera control, a button operation, changes in the background and sounds, and the like at the time of shooting, and thereafter reproducing the marked video.

SUMMARY

However, in each of JP H11-183996A, JP 2009-094585A, and JP 2007-082088A, it is only controlled, on the basis of information obtained in acquiring content, whether to perform a marking process.

Accordingly, the present disclosure proposes a content acquisition apparatus and a storage medium that are novel and improved, and are capable of marking content to be acquired and performing a process of acquiring content according to marking.

According to an embodiment of the present disclosure, there is provided a content acquisition apparatus including an acquisition unit configured to acquire content, a recognition unit configured to recognize at least two types of bookmark instructions when the acquisition unit acquires the content, and a control unit configured to, when the recognition unit recognizes a first bookmark instruction, provide a bookmark to the content acquired by the acquisition unit at corresponding time as a bookmarker at time of reproducing the content, and when the recognition unit recognizes a second bookmark instruction, provide the bookmark to the content acquired by the acquisition unit at corresponding time and switch an operation mode of the acquisition unit.

According to another embodiment of the present disclosure, there is provided a non-transitory computer-readable storage medium having a program stored therein, the program causing a computer to execute acquiring content, recognizing at least two types of bookmark instructions when the content is acquired, and providing, when a first bookmark instruction is recognized, a bookmark to the content acquired at corresponding time as a bookmarker at time of reproducing the content, and providing, when a second bookmark instruction is recognized, the bookmark to the content acquired at corresponding time and switching an operation mode of an acquisition unit that acquires the content.

As above, according to embodiments of the present disclosure, it is possible to mark content to be acquired and to perform a process of acquiring content according to marking.

BRIEF DESCRIPTION OF THE DRAWINGS

FIG. 3 is an explanatory diagram illustrating an example of a marking instruction to be recognized by a recognition unit according to the present embodiment;

FIG. 4 is an explanatory diagram illustrating an example of conditions that the recognition unit according to the present embodiment automatically recognizes a marking instruction;

DETAILED DESCRIPTION OF THE EMBODIMENT(S)

Figure 1:
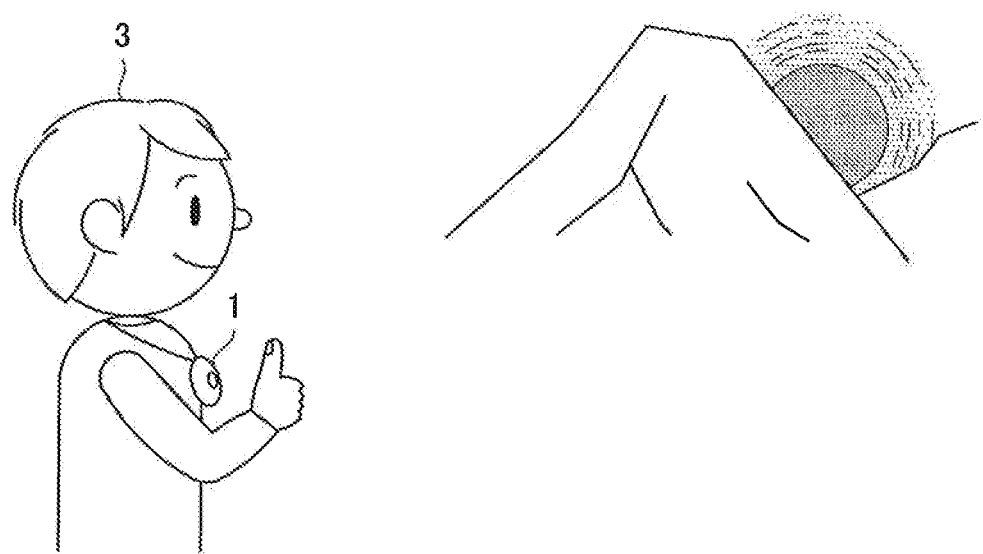
FIG. 1 is an explanatory diagram for describing an overview of an automatic shooting apparatus according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Content Acquisition Apparatus According to Embodiment of Present Disclosure
2. Basic Configurations
 [2-1. System Configuration]
 [2-2. Overview of Marking Operation]
 [2-3. Marking Operation Process]
 [2-4. Advantageous Effects]
3. Conclusion

1. Overview of Content Acquisition Apparatus According to Embodiment of Present Disclosure A content acquisition apparatus (automatic shooting apparatus 1) according to an embodiment of the present disclosure includes A. an acquisition unit (shooting unit 10, sensor unit 11) configured to acquire content;

B. a recognition unit (recognition unit 13) configured to recognize at least two types of bookmark instructions when the acquisition unit acquires the content; and C. a control unit (control unit 14) configured to, when the recognition unit recognizes a first bookmark instruction, provide a bookmark to the content acquired by the acquisition unit at corresponding time as a bookmarker at time of reproducing the content, and when the recognition unit recognizes a second bookmark instruction, provide the bookmark to the content acquired by the acquisition unit at corresponding time and switch an operation mode of the acquisition unit.

First, with reference to FIG. 1, an overview of the content acquisition apparatus according to the present embodiment will be described.

FIG. 1 is an explanatory diagram for describing an overview of the automatic shooting apparatus 1 according to the present embodiment. As illustrated in FIG. 1, the automatic shooting apparatus 1 is worn by a user 3, and stores (acquires) every action of the user 3 in a day as video, an image, sounds, or content obtained by combining each other. The automatic shooting apparatus 1, which is used as a lifelog in this way, may be worn by the user 3 such that a surface on which an imaging lens is installed faces outward as illustrated in FIG. 1.

Additionally, content according to the present embodiment includes video and an image shot by a camera installed on the automatic shooting apparatus 1, sounds collected by a microphone, or detection results of other various sensors. For simplification of the description, les us assume hereinafter that content refers to video.

The automatic shooting apparatus 1 can acquire content in a specific scene in which, for example, the user 3 passes a famous person, has an accident, or has a beautiful view, and mark (provide a mark to) a bookmark on the content as a bookmarker when the content is reproduced. Consequently, the automatic shooting apparatus 1 or a given information processing apparatus that receives the content marked by the automatic shooting apparatus 1 allows the user 3 to view only the specific scene by reproducing the content with reference to the bookmark.

Specifically, the automatic shooting apparatus 1 according to the present embodiment can recognize a marking instruction (bookmark instruction) issued by the user 3 in real time in acquiring content, and mark the content to be acquired. For example, the automatic shooting apparatus 1 recognizes a manual marking instruction on the basis of a button operation of the user 3 (user operation), a gesture as illustrated in FIG. 1, or speech of the user 3.

In addition, the automatic shooting apparatus 1 may automatically recognize a marking instruction on the basis of whether a predetermined condition is satisfied, in acquiring content, and mark the content to be acquired. For example, the automatic shooting apparatus 1 automatically recognizes, as a marking instruction, a change in acceleration caused by an action change such as collision, running, walking, and sitting, a change in a sound volume caused by sounds such as shouts of joy, applauds, and sounds of collision, a change in vital information such as a heart rate and perspiration, or a change in positional information such as movement to a specific area. Furthermore, the automatic shooting apparatus 1 may automatically recognize, as a marking instruction, a change in a facial expression such as detection of a smiling face and detection of a surprised face, a change in luminance such as an indoor/outdoor space, a light, and fireworks, or a lapse of a predetermined time.

Additionally, the automatic shooting apparatus 1 recognizing a marking instruction in real time in acquiring content, herein, means that the marking instruction is recognized at the same time or substantially the same time as the content is acquired.

The automatic shooting apparatus 1 can mark bookmarks having various attributes. More specifically, the automatic shooting apparatus 1 can mark, on content, bookmarks having attributes such as a specific scene from here/a specific scene up to here, good (affirmative)/normal/bad (negative), automatic marking/manual marking, people should see/people should not see, and people should hear/people should not hear. A bookmark having each attribute will be described below in detail.

For example, the automatic shooting apparatus 1 recognizes a marking instruction (first marking instruction) indicating that a scene has been a specific scene up to here, and marks a bookmark having an "up to here" attribute on content. To the contrary, the automatic shooting apparatus 1 recognizes a marking instruction (second marking instruction) indicating that a scene will be a specific scene from here, and marks a bookmark having a "from here" attribute on content. The user 3 can view a previous piece of content from the bookmark having an "up to here" attribute or the latter piece of content from the bookmark having a "from here" attribute.

Accordingly, as illustrated in FIG. 1, for example, the user 3 can mark a bookmark having a "from here" attribute on content through a marking instruction in the form of a gesture in a scene in which the sun is setting now. The user 3 can view the scene later in which the sun is setting, with reference to the bookmark having a "from here" attribute. To the contrary, the user 3 can mark a bookmark having an "up to here" attribute on content through a marking instruction in a scene in which, for example, a famous person has passed by a time before. The user 3 can view the scene later in which the famous person passes by, with reference to the bookmark having an "up to here" attribute.

Furthermore, the automatic shooting apparatus 1 can both mark a bookmark having a "from here" attribute and switch operational modes of a content acquisition unit. For example, the automatic shooting apparatus 1 can acquire high quality video and sounds by improving accuracy of acquiring content. The user 3 can therefore view and listen to video or sounds of a specific scene later with a higher quality than normal video or normal sounds, with reference to a bookmark having an "up to here" attribute.

The automatic shooting apparatus 1 can also mark, on content, a bookmark having an "affirmative" attribute (affirmative bookmark) indicating a good scene or a bookmark having a "negative" attribute (negative bookmark) indicating a bad scene. Accordingly, the user 3 can view both content on which the bookmark having an "affirmative" attribute is marked indicating a good scene, and content on which the bookmark having a "negative" attribute is marked indicating a bad scene.

The automatic shooting apparatus 1 can further mark, on content, a bookmark having a "manual" attribute indicating that the user 3 consciously issues a marking instruction. To the contrary, the automatic shooting apparatus 1 can mark, on content, a bookmark having an "automatic" attribute indicating that the automatic shooting apparatus 1 automatically performs a recognition process as a marking instruction on the basis of a change in acceleration, positional information, and the like. The user 3 can therefore view both the content that the user 3 has consciously marked, and the content that the automatic shooting apparatus 1 has automatically marked.

The attributes of the bookmarks described above can also be combined with each other. For example, the automatic shooting apparatus 1 can mark, on content, a bookmark having "from here," "affirmative," and "manual" attributes.

As above, the overview of the automatic shooting apparatus 1 according to the embodiment of the present disclosure has been described. Additionally, a way of wearing the automatic shooting apparatus 1 is not limited to hanging a lace attached to the automatic shooting apparatus 1 around the neck of the user 3 as illustrated in FIG. 1. For example, the automatic shooting apparatus 1 may be attached to a cap, clothes, a bag, glasses, and sunglasses of the user 3. Alternatively, the user 3 may have the automatic shooting apparatus 1 in a pocket of the clothes.

Next, with reference to FIGS. 2 to 6, configurations of the automatic shooting apparatus 1 according to the present embodiment will be described in detail.

2. Basic Configurations 2-1. System Configuration

Figure 2:
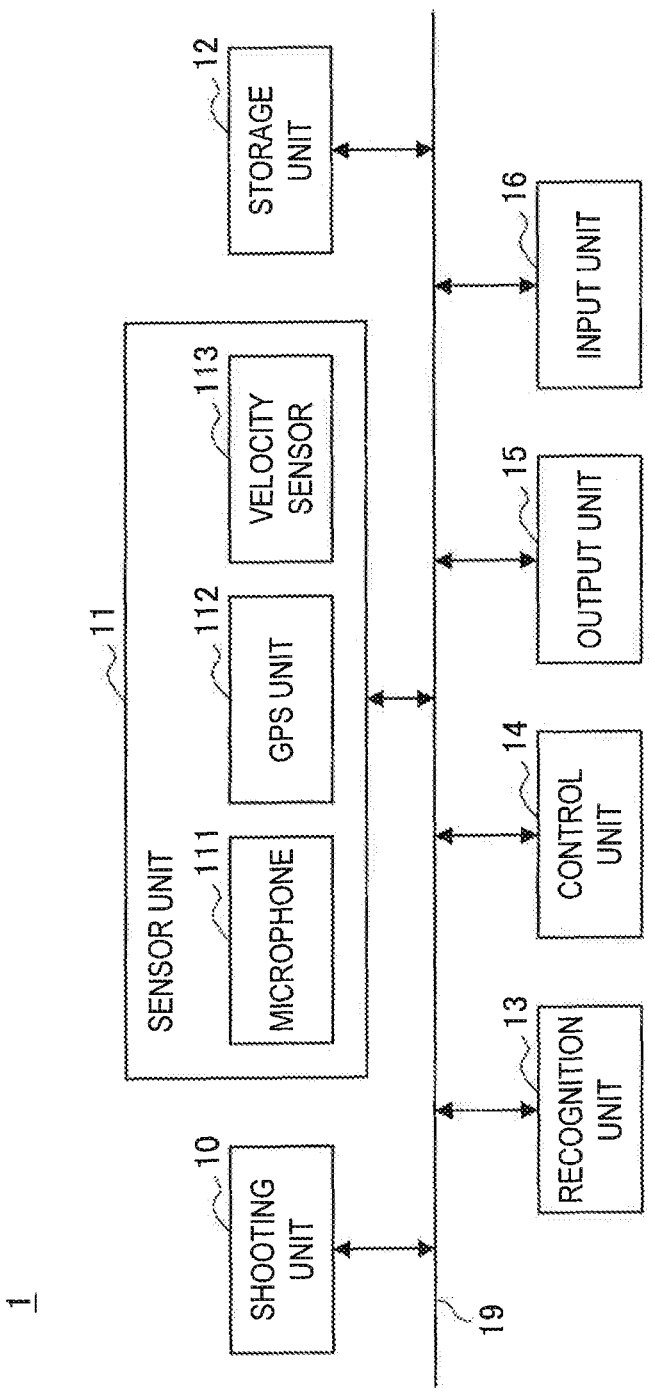
FIG. 2 is a block diagram illustrating a configuration of the automatic shooting apparatus according to the present embodiment.

FIG. 2 is a block diagram illustrating configurations of the automatic shooting apparatus 1 according to the present embodiment. As illustrated in FIG. 2, the automatic shooting apparatus 1 includes a shooting unit 10, a sensor unit 11, a storage unit 12, a recognition unit 13, a control unit 14, an output unit 15, and an input unit 16. The configurations of the automatic shooting apparatus 1 communicate with each other via a bus 19.

(Shooting Unit)

The shooting unit 10 includes an image sensor, an imaging optical system including an imaging lens, and a captured image signal processing unit, and outputs data of a captured image as digital signals. Additionally, the image sensor is, for example, a charge coupled device (CCD) imager or a complementary metal oxide semiconductor (CMOS) imager.

(Sensor Unit)

The sensor unit 11 outputs detection results of various sensors. More specifically, as illustrated in FIG. 2, the sensor unit 11 includes a microphone 111, a GPS unit 112, and a velocity sensor 113.

Microphone

The microphone 111 collects sounds around the microphone 111, and outputs sound data converted into digital signals via an amplifier and an analog to digital converter (ADC), for example.

GPS Unit

The GPS unit 112 receives radio waves from a global positioning system (GPS) satellite, thereby detecting and outputting the current position of the automatic shooting apparatus 1.

Velocity Sensor

The velocity sensor 113 detects and outputs velocity, angular velocity, acceleration, or the like of the automatic shooting apparatus 1.

(Storage Unit)

The storage unit 12 stores pieces of content acquired by the shooting unit 10 and the sensor unit 11 in association with a bookmark marked by the control unit 14. The storage unit 12 may perform a compression process on content to store the content. The storage unit 12 is, for example, flash memory such as card type memory or a recording medium such as a digital versatile disc (DVD) and a hard disk.

(Control Unit)

The control unit 14 functions as an arithmetic processing apparatus and a control apparatus, and controls the entire operations in the automatic shooting apparatus 1 in accordance with various programs. For example, the control unit 14 marks an attribute of a bookmark indicated by a marking instruction that has been recognized and output by the recognition unit 13 on video shot by the shooting unit 10. Subsequently, the control unit 14 causes the storage unit 12 to store the marked video. The control unit 14 may also edit the content with reference to the bookmark such that only a specific scene is reproduced by the output unit 15. The control unit 14 is, for example, a central processing unit (CPU) or a microprocessor. Additionally, the control unit 14 may include read only memory (ROM) that stores, for example, a program and an operation parameter to be used, and random access memory (RAM) that temporally stores, for example, a parameter varying as necessary.

(Recognition Unit)

The recognition unit 13 recognizes a marking instruction on the basis of video shot by the shooting unit 10, a detection result of the sensor unit 11, and an input to the input unit 16. For example, the recognition unit 13 recognizes a marking instruction on the basis of a gesture of the user 3 shot by the shooting unit 10, speech of the user 3 collected by the microphone 111, and acceleration detected by the velocity sensor 113. When recognizing the marking instruction, the recognition unit 13 outputs an attribute of a bookmark indicated by the marking instruction.

A specific example will be used below to describe a marking instruction to be recognized by the recognition unit 13. First, with reference to FIG. 3, a manual marking instruction of the user 3 will be described. Subsequently, with reference to FIGS. 4 to 5, a marking instruction that is automatically recognized will be described.

FIG. 3 is an explanatory diagram illustrating an example of a marking instruction that is recognized by the recognition unit 13 according to the present embodiment. As illustrated in FIG. 3, the automatic shooting apparatus 1 can recognize a gesture (1) of raising a thumb and a gesture (2) of lowering a thumb as marking instructions. The recognition unit 13 may recognize the gesture (1) of raising a thumb as a marking instruction that is issued in order to mark a bookmark having an "affirmative" attribute, and the gesture (2) of lowering a thumb as a marking instruction that is issued in order to mark a bookmark having a "negative" attribute.

Additionally, the same gestures may have different meaning owing to regions and cultures, for example. The automatic shooting apparatus 1 can set which gesture is a marking instruction indicating what attribute. A gesture is not limited to a gesture made by a hand as illustrated in FIG. 3.

FIG. 4 is an explanatory diagram illustrating an example of conditions for the recognition unit 13 according to the present embodiment to automatically recognize a marking instruction. As illustrated in FIG. 4, the automatic shooting apparatus 1 recognizes a marking instruction on the basis of a sudden change in acceleration detected by the velocity sensor 113, a sudden change in a sound volume detected by the microphone 111, and positional information detected by the GPS unit 112. In addition, the automatic shooting apparatus 1 recognizes a marking instruction on the basis that a smiling face is recognized as a result of image recognition of video shot by the shooting unit 10 and that a change in luminance is detected. Such conditions (230) will be hereinafter referred to as automatic recognition conditions.

It is set for each automatic recognition condition whether the automatic shooting apparatus 1 performs a marking process if an automatic recognition condition is satisfied, and what attribute of a bookmark is marked. For example, if the microphone 111 detects a sudden change in a sound volume, the recognition unit 13 determines that a marking process is performed, and outputs "negative" and "from here" attributes. Subsequently, the control unit 14 marks a bookmark having "negative" and "from here" attributes on the content shot by the shooting unit 10.

Such automatic recognition conditions may have priority rankings. For example, if a sudden change in a sound volume and a smiling face are detected at the same time, the control unit 14 may preferentially mark a "negative" bookmark on the sudden change in a sound volume. In addition, if a sudden change in a sound volume and a smiling face are detected at the same time, the control unit 14 may prioritize an "affirmative" attribute and mark an "affirmative" bookmark.

The automatic recognition conditions illustrated in FIG. 4 may be displayed, for example, by the output unit 15. Furthermore, an automatic recognition condition of a marking instruction may also be set, for example, by the input unit 16. Next, with reference to FIG. 5, an example in which the input unit 16 sets a condition will be described in detail.

Figure 5:
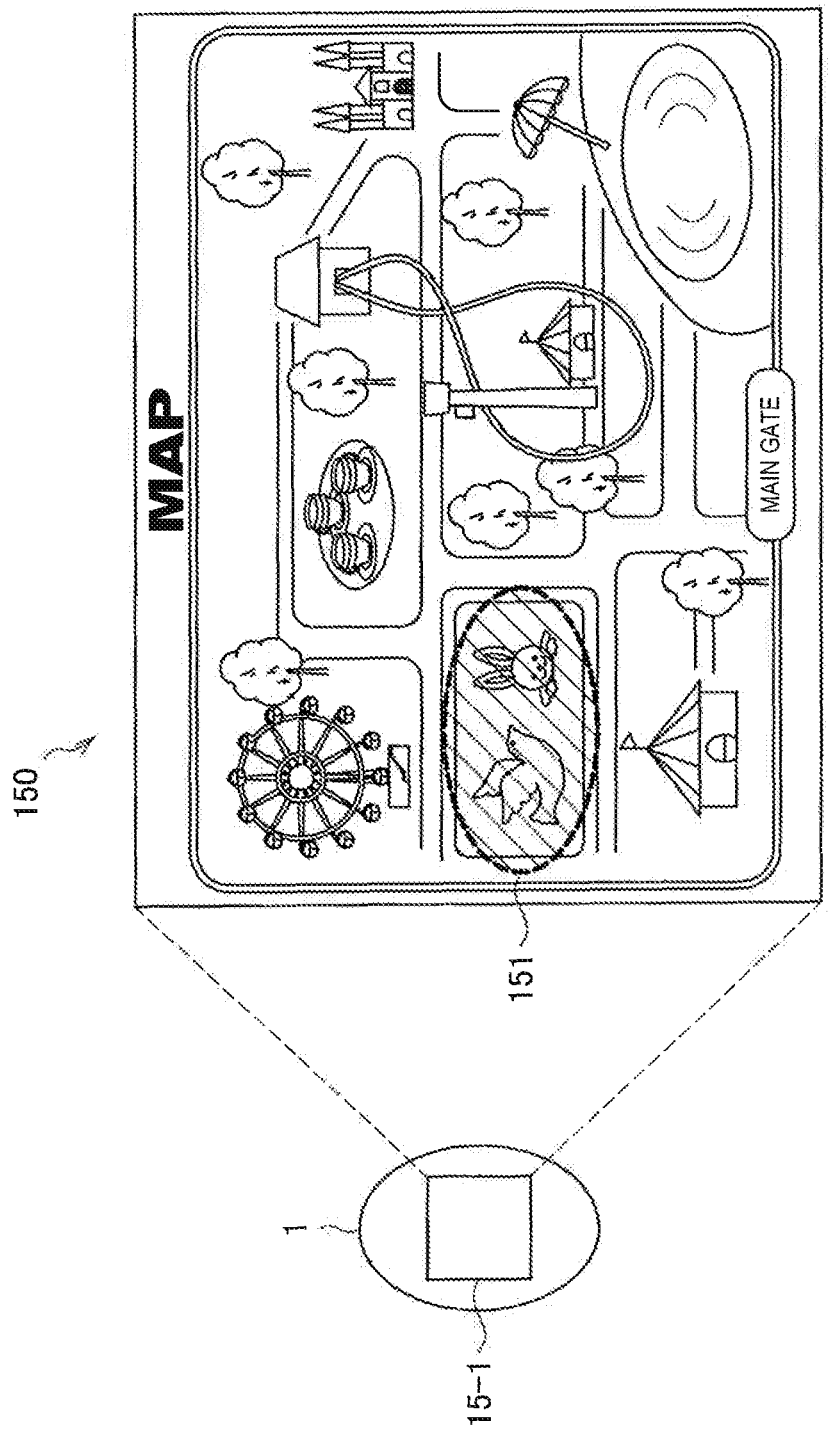
FIG. 5 is an explanatory diagram illustrating an example in which the automatic shooting apparatus according to the present embodiment sets an automatic recognition condition.

FIG. 5 is an explanatory diagram illustrating an example in which the automatic shooting apparatus 1 according to the present embodiment sets an automatic recognition condition. As illustrated in FIG. 5, a display unit 15-1 having a function of displaying video and an image among functions of the output unit 15 displays a setting screen 150 for setting an automatic recognition condition of a marking instruction based on positional information. The display unit 15-1 may be installed on the back of the automatic shooting apparatus 1, which is a surface opposite to the surface on which an imaging lens of the shooting unit 10 is installed.

For example, if the user 3 sets a specific position range 151 as an automatic recognition condition of a marking instruction and the automatic shooting apparatus 1 is positioned within the position range 151, the control unit 14 performs an automatic recognition process as a marking instruction and marks a predetermined bookmark on content. More specifically, the control unit 14 may mark a bookmark having a "from here" attribute on content acquired when the user 3 enters the specific position range 151. Meanwhile, the control unit 14 may mark a bookmark having an "up to here" attribute on content acquired when the user 3 leaves the specific position range 151.

In this way, if the recognition unit 13 recognizes a preliminary stage to acquire a specific scene, the control unit 14 may mark a bookmark having a "from here" attribute on video shot by the shooting unit 10 at the corresponding time. For example, the control unit 14 may mark a bookmark having a "from here" attribute on content acquired at the sunset time. The control unit 14 may also mark a bookmark having a "from here" attribute on content acquired at the time of an event that has been externally reported while the user 3 is in the amusement part or the like.

(Output Unit)

The output unit 15 outputs, for example, video, an image, music, sounds, vibration, and light. For example, the output unit 15 may output video and an image shot by the shooting unit 10. The output unit 15 may also output video and an image stored in the storage unit 12 with reference to a bookmark. The output unit 15 may further report to the user 3 in the form of video, music, sounds, vibration, light emission, or the like that the recognition unit 13 recognizes a marking instruction, and that the control unit 14 performs a marking process. It may be further reported what attribute (type) is indicated by the marking instruction. The output unit 15 is, for example, a cathode ray tube (CRT) display apparatus, a liquid crystal display apparatus, a speaker, and a vibrating motor.

(Input Unit)

The input unit 16 has a function of receiving an input of a marking instruction from a user. For example, the input unit 16 is a button, a keyboard, and a mouse. For example, the recognition unit 13 may recognize that a marking instruction indicates a bookmark having an "affirmative" attribute if a button is pushed down for a short time, or that a marking instruction indicates a bookmark having a "negative" attribute if a button is pushed down for a long time. In addition, the recognition unit 13 may recognize that a marking instruction indicates a bookmark having an "affirmative" attribute if a button is pushed down once, or that a marking instruction indicates a bookmark having a "negative" attribute if a button is pushed down twice. The input unit 16 may also be a touch panel that is integrated with the output unit 15.

(Supplement)

Figure 6:
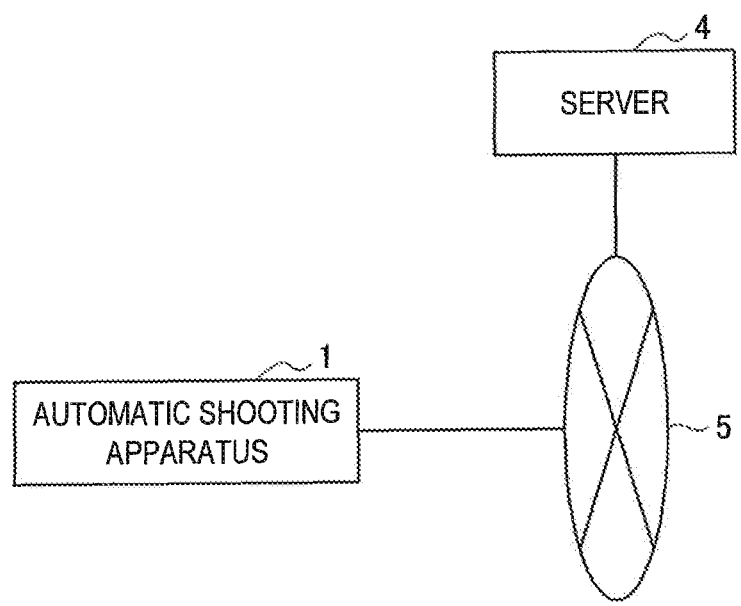
FIG. 6 is an explanatory diagram for describing an example of an operation of the automatic shooting apparatus according to the present embodiment.

Additionally, the automatic shooting apparatus 1 is capable of not only causing the storage unit 12 to store marked video, but also transmitting the marked video to a given external apparatus. Such external apparatus can reproduce and distribute the video with reference to bookmark information. With reference to FIG. 6, such a modified example will be described.

FIG. 6 is an explanatory diagram for describing an example of an operation of the automatic shooting apparatus 1 according to the present embodiment. As illustrated in FIG. 6, the automatic shooting apparatus 1 can transmit marked video stored in the storage unit 12 to a server 4 via a network 5. The server 4 stores the marked video received from the automatic shooting apparatus 1. A connection to the server 4 via the network 5 allows a given information processing apparatus that is not shown to reproduce the video with reference to a bookmark.

2-2. Overview of Marking Operation

As above, the configurations of the automatic shooting apparatus 1 have been described. Next, with reference to FIG. 7, an overview of a marking operation of the automatic shooting apparatus 1 will be described. Three types of attributes will be treated below as attributes of a bookmark: a "from here/up to here" attribute; an "affirmative/normal/negative" attribute; and an "automatic/manual" attribute. Let us assume that a gesture of the user 3 raising the thumb of the right hand is a marking instruction indicating "manual," "affirmative," and "from here" attributes, and that a gesture of the user 3 raising the thumb of the left hand is a marking instruction indicating "manual," "affirmative," and "up to here" attributes.

Figure 7:
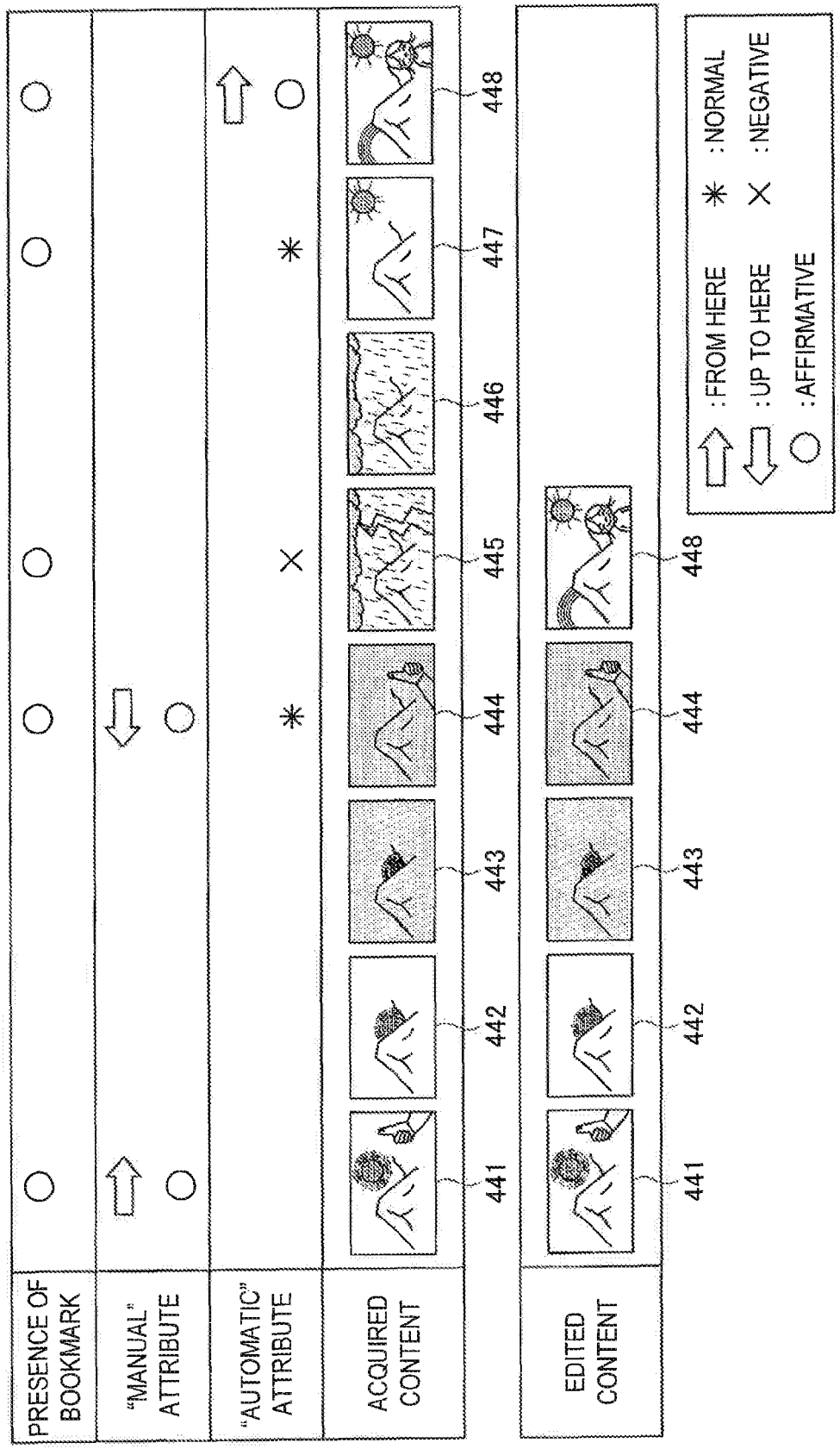
FIG. 7 is an explanatory diagram for describing an overview of a marking operation of the automatic shooting apparatus according to the present embodiment.

FIG. 7 is an explanatory diagram for describing an overview of a marking operation of the automatic shooting apparatus 1 according to the present embodiment. As illustrated in FIG. 7, a bookmark having various attributes is marked on content acquired by the automatic shooting apparatus 1, and the content is stored in the storage unit 12 (400). The marked bookmark has at least one of a "manual" attribute input by the user 3 through a gesture or the input unit 16, and an "automatic" attribute automatically recognized by the automatic shooting apparatus 1.

For example, the automatic shooting apparatus 1 recognizes a gesture of the user 3 raising the thumb of the right hand, and marks a bookmark having "manual," "affirmative," and "from here" attributes on content 441 acquired in recognizing the gesture. More specifically, the recognition unit 13 outputs a "manual" attribute on the basis that the user 3 consciously makes a gesture, an "affirmative" attribute on the basis of the gesture of raising the thumb, and a "from here" attribute on the basis that the right hand makes the gesture. The control unit 14 marks the bookmark having "manual," "affirmative," and "from here" attributes output by the recognition unit 13 on the content 441 acquired when the gesture is recognized.

The automatic shooting apparatus 1 recognizes a gesture of the user 3 raising the thumb of the left hand, and marks a bookmark having "manual," "affirmative," and "up to here" attributes on content 444 acquired when the gesture is recognized. More specifically, the recognition unit 13 outputs a "manual" attribute on the basis that the user 3 consciously makes the gesture, an "affirmative" attribute on the basis of the gesture of raising the thumb, and an "up to here" attribute on the basis that the left hand makes the gesture. The control unit 14 marks the bookmark having "manual," "affirmative," and "up to here" attributes output by the recognition unit 13 on the content 444 acquired when the gesture is recognized. The automatic shooting apparatus 1 further recognizes a change in luminance owing to sunset, and marks a bookmark having "automatic" and "normal" attributes on the content 444 acquired in recognizing the change.

The automatic shooting apparatus 1 recognizes a change in a sound volume caused by thunder, and marks a bookmark having "automatic," "negative," and "from here" attributes on content 445 acquired when the change is recognized. To the contrary, the automatic shooting apparatus 1 recognizes a change in luminance caused by sunrise, and marks a bookmark having "automatic" and "normal" attributes on content 447 acquired when the change is recognized. The automatic shooting apparatus 1 further recognizes a smiling face of a person shot by the shooting unit 10, and marks a bookmark having "automatic," "affirmative," and "from here" attributes on content 448 acquired when the smiling face is recognized.

The control unit 14 generates edited content such that the output unit 15 reproduces only the pieces of content each having the "affirmative" attribute on the basis of the bookmarks. The attributes may have priority rankings. For example, a bookmark having a "manual" attribute may have higher priority than a bookmark having an "automatic" attribute because the bookmark having a "manual" attribute is marked by the user 3 through a conscious marking instruction. Consequently, the edited content includes the pieces of content from the content 441 having "affirmative" and "up to here" attributes to the content 444 having an "up to here" attribute, and the content 448 having an "affirmative" attribute.

As shown regarding the content 441 and content 444, a marking instruction through a gesture may probably prevent a user from viewing content because the gesture is projected in video shot by the shooting unit 10. The automatic shooting apparatus 1 may therefore mark a bookmark having a "from here" attribute on content acquired a predetermined time after a marking instruction through a gesture is recognized. The automatic shooting apparatus 1 may also mark a bookmark having an "up to here" attribute on content acquired a predetermined time before a marking instruction through a gesture is recognized. That is, the automatic shooting apparatus 1 may mark the bookmark having "manual," "affirmative," and "from here" attributes on the content 442, and the bookmark having "manual," "affirmative," and "up to here" attributes on the content 443.

2-3. Marking Operation Process

As above, the overview of the marking operation of the automatic shooting apparatus 1 has been described. Next, with reference to FIGS. 8 to 10, a making operation process will be described.

Figure 8:
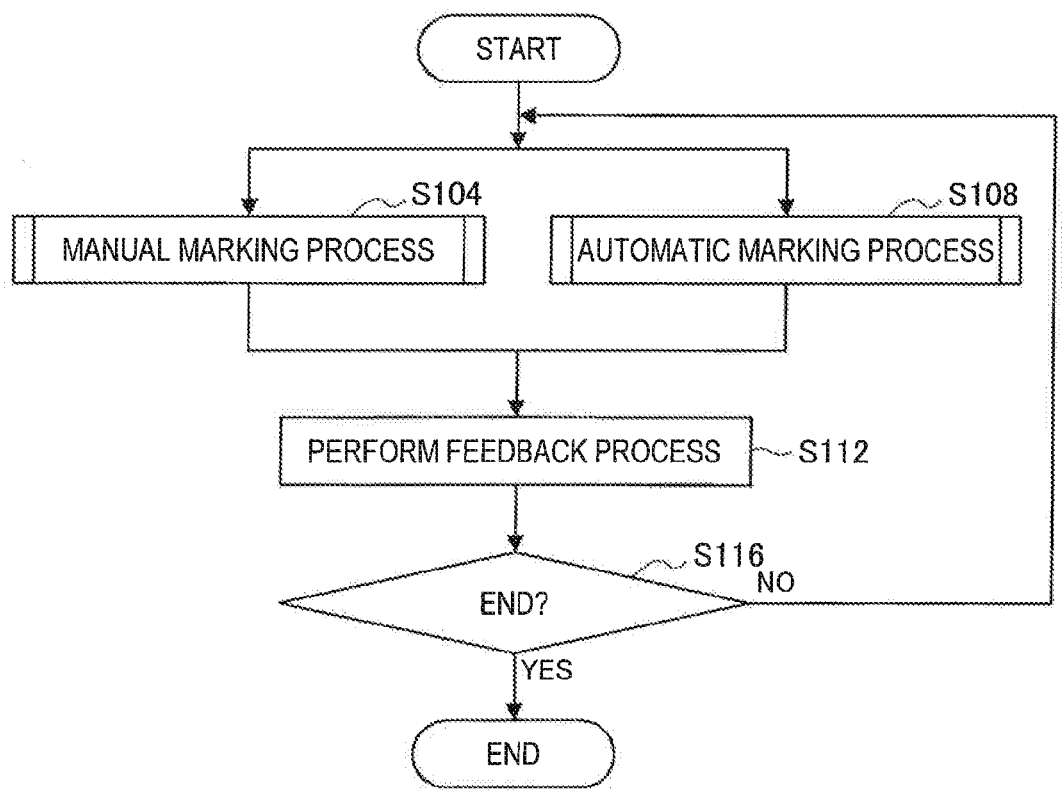
FIG. 8 is a flowchart illustrating an operation process of the automatic shooting apparatus according to the present embodiment.

FIG. 8 is a flowchart illustrating an operation process of the automatic shooting apparatus 1 according to the present embodiment. As illustrated in FIG. 8, the automatic shooting apparatus 1 performs a manual marking process in step S104, and an automatic marking process in step S108. The manual marking process in step S104 indicates a marking process based on a conscious marking instruction issued by the user 3 through a gesture, an input to the input unit 16, or the like, which will be described with reference to FIG. 9. The automatic marking process in step S108 indicates a marking process based on the automatic recognition conditions, which will be described with reference to FIG. 10.

Next, in step S112, the output unit 15 reports to the user 3 that a marking instruction is recognized by the recognition unit 13, and that the control unit 14 performs a marking process. The output unit 15 also reports an attribute indicated by the marking instruction. More specifically, the output unit 15 reports to the user 3 in the form of video, an image, music, sounds, vibration, light emission, or the like. For example, when a bookmark having an "affirmative" attribute is marked, the output unit 15 may reproduce favorite music, produce a sound once, vibrate once, or emit a predetermined color (such as green). To the contrary, when a bookmark having a "negative" attribute is marked, the output unit 15 may produce sounds twice, vibrate twice, or emit a predetermined color (such as red).

Subsequently, in step S116, the control unit 14 determines whether to finish the marking process. For example, the control unit 14 makes a determination on the basis whether the automatic shooting apparatus 1 is turned on or off, or whether an instruction for finishing the marking process is input into the input unit 16. If it is thereafter determined that the process is not finished (S116/No), the process proceeds again to step S104 and S108. If it is determined that the process is finished (S116/Yes), the process is finished.

(Manual Marking Process)

Figure 9:
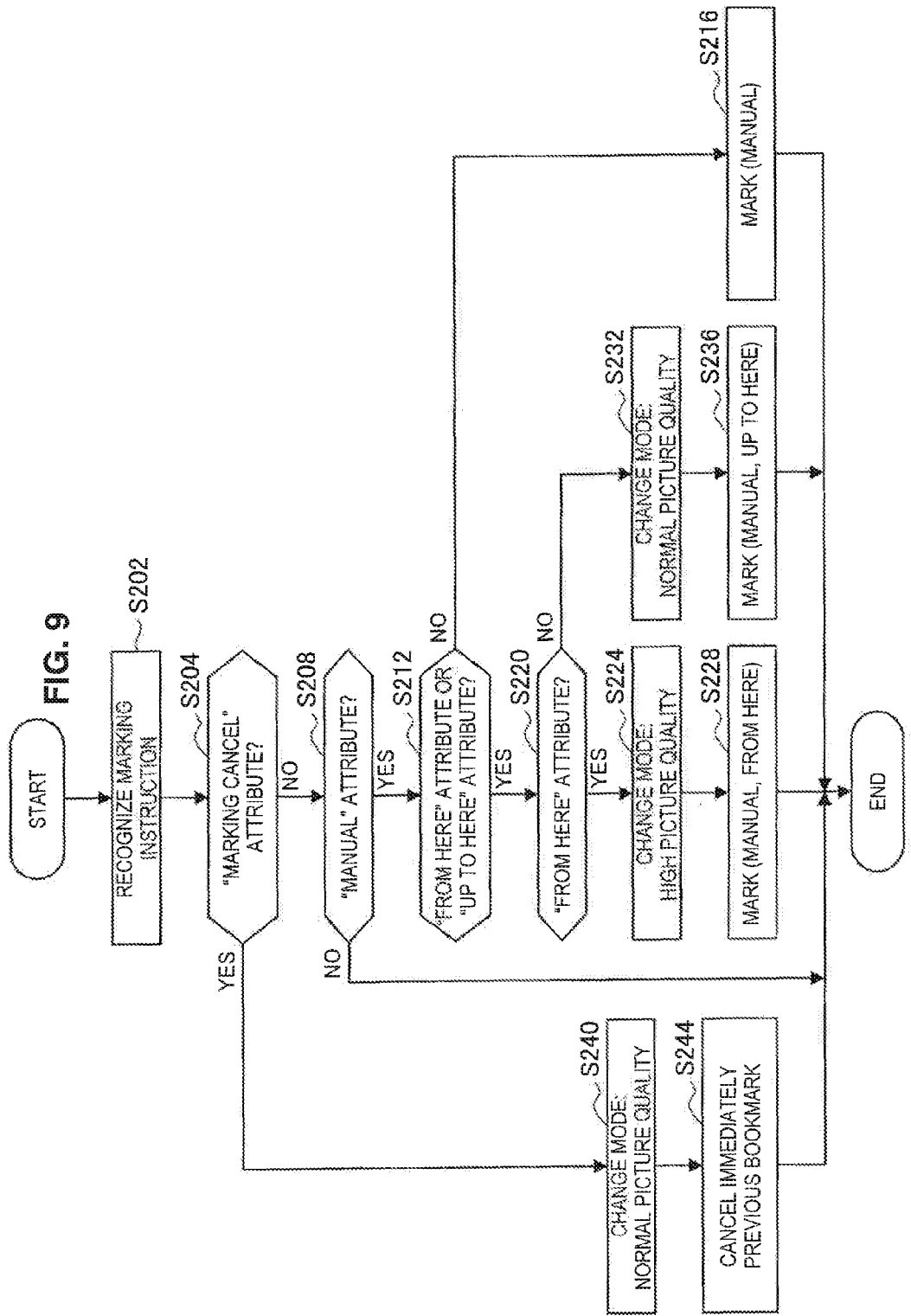
FIG. 9 is a flowchart illustrating a manual marking process according to the present embodiment.

FIG. 9 is a flowchart illustrating a manual marking process according to the present embodiment. As illustrated in FIG. 9, first, in step S202, the recognition unit 13 recognizes a marking instruction. For example, the recognition unit 13 recognizes a marking instruction on the basis of a gesture made by the user 3, sounds, or an input into the input unit 16. If the marking instruction recognized by the recognition unit 13 does not indicate a "marking cancel" attribute (S204/No), the process proceeds to step S208.

If the marking instruction recognized by the recognition unit 13 in step S202 indicates a "manual" attribute (S208/Yes), and if the marking instruction does not indicate a "from here" attribute or an "up to here" attribute (S212/No), the process proceeds to step S216. In step S216, the control unit 14 marks a bookmark having a "manual" attribute on video shot by the shooting unit 10, and causes the storage unit 12 to store the bookmark. The control unit 14 may also mark a bookmark having another attribute indicated by the marking instruction recognized in step S202.

Meanwhile, if the marking instruction recognized by the recognition unit 13 in step S202 indicates a "manual" attribute (S208/Yes) and a "from here" attribute (S212/Yes, S220/Yes), the process proceeds to step S224. In step S224, the control unit 14 switches an operation mode of the shooting unit 10 to a high picture quality mode. In the high picture quality mode, higher quality content can be acquired than in a normal operation mode.

For example, the control unit 14 may have the shooting unit 10 be more accurate, decrease compressibility of shot video, activate a damping mechanism that is not shown, and increase a frequency of shooting images. In addition, GPS information may be added to the shot video. If content is sounds, for example, the control unit 14 may switch outputs of sounds collected by the microphone 111 from an MPEG audio layer-3 (MP3) format to a direct stream digital (DSD) format. Let us assume that the shooting unit 10 normally shoots video or an image in a normal picture quality mode.

Subsequently, in step S228, the control unit 14 marks a bookmark having "manual" and "from here" attributes on video shot by the shooting unit 10 in a high picture quality mode, and causes the storage unit 12 to store the bookmark. The control unit 14 may also mark a bookmark having another attribute indicated by the marking instruction recognized in step 202.

Meanwhile, if the marking instruction recognized by the recognition unit 13 in step S202 indicates a "manual" attribute (S208/Yes) and an "up to here" attribute (S212/Yes, S220/No), the process proceeds to step S232. In step S232, the control unit 14 switches the operation mode of the shooting unit 10 to the normal picture quality mode. If the operation mode of the shooting unit 10 has been switched to the high picture quality mode before that time in step S224, the control unit 14 returns the operation mode of the shooting unit 10 to the normal picture quality mode, which is the operation mode before switched.

Subsequently, in step S236, the control unit 14 marks a bookmark having "manual" and "up to here" attributes on video shot by the shooting unit 10 in the normal picture quality mode, and causes the storage unit 12 to store the bookmark. The control unit 14 may also mark a bookmark having another attribute indicated by the marking instruction recognized in step S202.

If the marking instruction recognized by the recognition unit 13 indicates a "marking cancel" attribute (S204/Yes), the shooting unit 10 switches, in step S240, the operation mode to the normal picture quality mode in the same way as step S232. Subsequently, if there is a bookmark that has been marked before that time, the control unit 14 cancels, in step S224, the bookmark that has been marked immediately before. If the canceled bookmark has a "from here" attribute, the control unit 14 may reprocess the video stored in the storage unit 12 and shot in the high picture quality mode in step S224 to be the same as the video in the normal picture quality mode.

(Automatic Marking Process)

Figure 10:
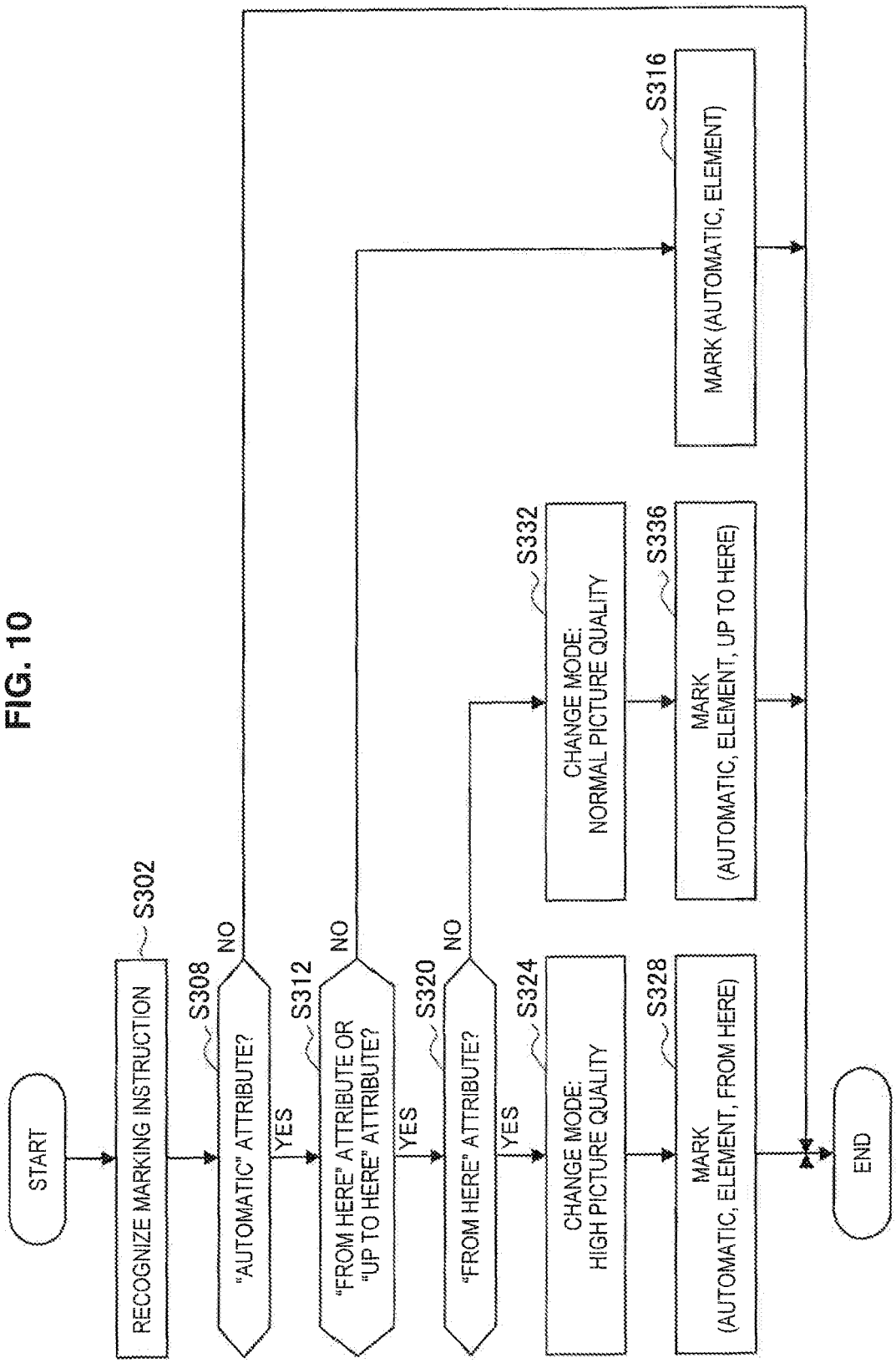
FIG. 10 is a flowchart illustrating an automatic marking process according to the present embodiment.

FIG. 10 is a flowchart illustrating an automatic marking process according to the present embodiment. As illustrated in FIG. 10, first, in step S302, the recognition unit 13 recognizes a marking instruction. For example, the recognition unit 13 of the automatic shooting apparatus 1 recognizes a marking instruction on the basis of a sudden change in acceleration, a sudden change in a sound volume, a change in positional information, a change in luminance, and detection of a smiling face.

If the marking instruction recognized by the recognition unit 13 in step S302 indicates an "automatic" attribute (S308/Yes) but does not indicate a "from here" attribute or an "up to here" attribute (S312/No), the process proceeds to step S316. In step S316, the control unit 14 marks a bookmark having an "automatic" attribute on video shot by the shooting unit 10, and causes the storage unit 12 to store the bookmark. The control unit 14 may also mark a bookmark having another attribute indicated by the marking instruction recognized in step S302 and the automatic recognition conditions such as a sudden change in acceleration and a sudden change in a sound volume, which has been recognized in step S302.

If the marking instruction recognized by the recognition unit 13 in step S302 indicates an "automatic" attribute (S308/Yes) and a "from here" attribute (S312/Yes, S320/Yes), the process proceeds to step S324. In step S324, the control unit 14 switches the operation mode of the shooting unit 10 to the high picture quality mode in the same way as step S224. In the high picture quality mode, higher quality content can be acquired than in the normal operation mode.

Subsequently, in step S328, the control unit 14 marks the bookmark having "automatic" and "from here" attributes on video shot by the shooting unit 10 in the high picture quality mode, and causes the storage unit 12 to store the bookmark. The control unit 14 may also mark a bookmark having another attribute indicated by the marking instruction recognized in step S302, and the automatic recognition conditions such as a sudden change in acceleration and a sudden change in a sound volume, which have been recognized in step S302.

Meanwhile, if the marking instruction recognized by the recognition unit 13 in step S302 indicates an "automatic" attribute (S308/Yes) and an "up to here" attribute (S312/Yes, S320/No), the process proceeds to step S332. In step S332, the control unit 14 switches the operation mode of the shooting unit 10 to the normal picture quality mode in the same way as step S232. Subsequently, in step S336, the control unit 14 marks the bookmark having "automatic" and "up to here" attributes on video shot by the shooting unit 10 in the normal picture quality, and causes the storage unit 12 to store the bookmark. The control unit 14 may also mark a bookmark having another attribute indicated by the marking instruction recognized in step S302 and the automatic recognition conditions such as a sudden change in acceleration and a sudden change in a sound volume, which have been recognized in step S302.

(Supplement)

A bookmark may be weighted. For example, the control unit 14 may mark the most weighted bookmark at the time of recognition of a marking instruction, and may mark a less weighted bookmark as the time of recognition of the marking instruction is farther. In addition, the control unit 14 may assign different weighting on the basis of attributes indicated by a marking instruction. For example, the control unit 14 may weight a bookmark having a "from here" attribute more than a bookmark having an "up to here" attribute. Such weighting may be referred to by the user 3 when the user 3 views content.

If the recognition unit 13 recognizes a marking instruction indicating the same attribute as an attribute indicated by a marking instruction that has been recognized by the recognition unit 13 immediately before, the control unit 14 may mark the more weighted bookmark. For example, if the recognition unit 13 repeatedly recognizes marking instructions each indicating "manual" and "affirmative" attributes, the control unit 14 may mark a bookmark having "manual" and "very affirmative" attributes as a scene that the user 3 especially likes.

If the recognition unit 13 recognizes speech of the user 3 as a marking instruction, the control unit 14 may delete the marking instruction through the speech of the user 3 recognized by the recognition unit 13 from sounds collected by the microphone 111, and may cause the storage unit 12 to store the sounds from which the marking instruction has been deleted. For example, if speech of the user 3 "from here" is recognized and marked, the control unit 14 may perform signal processing such that the speech "from here" is deleted. If the recognition unit 13 recognizes a marking instruction indicating a "people should not see" attribute, the control unit 14 may delete video shot by the shooting unit 10 and may cause the storage unit 12 to store only sounds. In addition, for example, if the recognition unit 13 recognizes a marking instruction indicating a "people should not hear" attribute, the control unit 14 may delete speech collected by the microphone 111 and may cause the storage unit 12 to store only video shot by the shooting unit 10.

Additionally, the control unit 14 may change a bookmark marked on content stored in the storage unit 12, on the basis of the automatic recognition conditions included in the bookmark marked in the automatic marking process. More specifically, if setting of the automatic recognition conditions illustrated in FIG. 4 is changed, an attribute of a bookmark may be updated on the basis of the changed setting. For example, if setting is changed such that a bookmark having an "affirmative" attribute is marked at the time of detection of a change in luminance in FIG. 4, the control unit 14 may update the bookmark marked on the content 447 illustrated in FIG. 7 such that the bookmark has "automatic" and "affirmative" attributes.

2-4. Advantageous Effects

As described above, the automatic shooting apparatus 1 can shoot content and mark a bookmark on the content at the same time or substantially the same time. The user 3 can therefore view only a specific scene by reproducing the content with reference to the bookmark. The automatic shooting apparatus 1 can also perform a marking process and switch the operation mode of the shooting unit 10 to the high picture quality mode. Accordingly, the user 3 can view the specific scene with higher picture quality video than the normal picture quality video. Since the automatic shooting apparatus 1 can also switch the operation mode to a high sound quality mode, the user 3 can also listen to a specific scene with a higher sound quality than a normal sound quality.

The automatic shooting apparatus 1 can mark a bookmark having various attributes. Accordingly, the automatic shooting apparatus 1 can edit content on the basis of the various attributes. For example, the automatic shooting apparatus 1 can edit a collection of impressive scenes obtained by collecting only pieces of content on which bookmarks each having an "affirmative" attribute are marked, and a collection of bloopers obtained by collecting only pieces of content on which bookmarks each having a "negative" attribute are marked.

The automatic shooting apparatus 1 can also report to the user 3 through the output unit 15 that a marking instruction is recognized and marked on content, and what attribute is indicated by the marking instruction. Accordingly, if the user 3 is unsatisfied with the reported contents, the user 3 can delete a bookmark by using a marking instruction indicating a "marking cancel" attribute. In this way, a report of the automatic shooting apparatus 1 to the user 3 can interfere marking from malfunctioning.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A content acquisition apparatus including:
an acquisition unit configured to acquire content;
a recognition unit configured to recognize at least two types of bookmark instructions when the acquisition unit acquires the content; and
a control unit configured to, when the recognition unit recognizes a first bookmark instruction, provide a bookmark to the content acquired by the acquisition unit at corresponding time as a bookmarker at time of reproducing the content, and when the recognition unit recognizes a second bookmark instruction, provide the bookmark to the content acquired by the acquisition unit at corresponding time and switch an operation mode of the acquisition unit.

(2) The content acquisition apparatus according to (1), wherein, when the recognition unit recognizes the second bookmark instruction, the control unit switches the operation mode of the acquisition unit to an operation mode in which content having a higher quality than content of a normal operation mode is acquirable.

(3) The content acquisition apparatus according to (1) or (2), further including:
an output unit configured to output a type of each of the bookmark instructions recognized by the recognition unit.

(4) The content acquisition apparatus according to any one of (1) to (3), wherein, when the recognition unit recognizes a predetermined bookmark instruction after the operation mode of the acquisition unit is switched, the control unit returns the operation mode to the operation mode before having been switched.

(5) The content acquisition apparatus according to any one of (1) to (4), wherein, when the recognition unit recognizes a predetermined bookmark instruction after the recognition unit recognizes the bookmark instructions and provides the bookmark to the content, the control unit deletes the bookmark.

(6) The content acquisition apparatus according to any one of (1) to (5), wherein the control unit provides the bookmark to the content acquired by the acquisition unit a predetermined time after the recognition unit recognizes the second bookmark instruction.

(7) The content acquisition apparatus according to any one of (1) to (3), wherein the control unit provides the bookmark to the content acquired by the acquisition unit a predetermined time before the recognition unit recognizes the first bookmark instruction.

(8) The content acquisition apparatus according to any one of (1) to (7),
wherein the recognition unit further recognizes which of the first bookmark instruction and the second bookmark instruction is issued to provide which of an affirmative bookmark and a negative bookmark, and
wherein the control unit provides any of the affirmative bookmark and the negative bookmark to the content in accordance with a recognition result of the recognition unit.

(9) The content acquisition apparatus according to (8), further including:
an output unit configured to output a type of each of the bookmark instructions recognized by the recognition unit,
wherein the output unit outputs which of the first bookmark instruction and the second bookmark instruction is issued to provide which of the affirmative bookmark and the negative bookmark.

(10) The content acquisition apparatus according to any one of (1) to (9), wherein the recognition unit recognizes the bookmark instructions, based on a gesture shown in a captured image acquired in real time when the acquisition unit acquires the content.

(11) The content acquisition apparatus according to any one of (1) to (10), wherein the recognition unit recognizes the bookmark instructions, based on a recognition result of a sound acquired in real time when the acquisition unit acquires the content.

(12) The content acquisition apparatus according to any one of (1) to (11), wherein the recognition unit recognizes the bookmark instructions, based on a user operation acquired in real time when the acquisition unit acquires the content.

(13) The content acquisition apparatus according to any one of (1) to (12), wherein the recognition unit recognizes the bookmark instructions, based on a change in acceleration acquired in real time when the acquisition unit acquires the content.

(14) A non-transitory computer-readable storage medium having a program stored therein, the program causing a computer to execute:
acquiring content;
recognizing at least two types of bookmark instructions when the content is acquired; and
providing, when a first bookmark instruction is recognized, a bookmark to the content acquired at corresponding time as a bookmarker at time of reproducing the content, and providing, when a second bookmark instruction is recognized, the bookmark to the content acquired at corresponding time and switching an operation mode of an acquisition unit that acquires the content.

(15) A content acquisition apparatus including:
an acquisition unit configured to acquire content;
a recognition unit configured to recognize a preliminary stage to acquire predetermined content by the acquisition unit; and
a control unit configured to, when the recognition unit recognizes the preliminary stage to acquire the predetermined content, provide a bookmark to the content acquired by the acquisition unit at corresponding time as a bookmarker at time of reproducing the content, and switch an operation mode of the acquisition unit.

What is claimed is:

1. A content acquisition apparatus comprising:
an acquisition unit configured to acquire content;
a recognition unit configured to recognize a marking instruction when the acquisition unit acquires the content; and
a control unit configured to, when the recognition unit recognizes the marking instruction to be a first bookmark instruction, provide a bookmark at a corresponding time to the acquired content so as to be a bookmarker for when the content is reproduced, and when the recognition unit recognizes the marking instruction to be a second bookmark instruction, provide the bookmark at the corresponding time to the acquired content and switch an operation mode of the acquisition unit,
wherein the acquisition unit, the recognition unit, and the control unit are each implemented via at least one processor.

2. The content acquisition apparatus according to claim 1, wherein, when the recognition unit recognizes the marking instruction to be the second bookmark instruction, the control unit switches the operation mode of the acquisition unit to an operation mode configured to acquire content having a higher quality than content of a normal operation mode.

3. The content acquisition apparatus according to claim 1, further comprising:
an output unit configured to provide an output that indicates which of the first bookmark instruction or the second bookmark instruction is recognized to be the marking instruction,
wherein the output unit is implemented via at least one processor.

4. The content acquisition apparatus according to claim 1, wherein, when the recognition unit recognizes a predetermined bookmark instruction after the operation mode of the acquisition unit is switched, the control unit returns the operation mode to the operation mode before having been switched.

5. The content acquisition apparatus according to claim 1, wherein, when the recognition unit recognizes a predetermined bookmark instruction after recognizing the marking instruction and providing the bookmark to the acquired content, the control unit deletes the bookmark.

6. The content acquisition apparatus according to claim 1, wherein the control unit provides the bookmark to the acquired content acquisition unit a predetermined time after the recognition unit recognizes the marking instruction to be the second bookmark instruction.

7. The content acquisition apparatus according to claim 1, wherein the control unit provides the bookmark to the acquired content a predetermined time before the recognition unit recognizes the marking instruction to be the first bookmark instruction.

8. The content acquisition apparatus according to claim 1,
wherein the recognition unit further recognizes which of the first bookmark instruction or the second bookmark instruction is provided as the marking instruction, to selectively provide an affirmative bookmark or a negative bookmark, and
wherein the control unit provides the affirmative bookmark or the negative bookmark to the acquired content in accordance with a recognition result of the recognition unit.

9. The content acquisition apparatus according to claim 8, further comprising:
an output unit configured to provide an output that indicates which of the first bookmark instruction or the second bookmark instruction is recognized to be the marking instruction,
wherein the output from the output unit indicates which of the first bookmark instruction or the second bookmark instruction is provided as the marking instruction to selectively provide the affirmative bookmark or the negative bookmark, and
wherein the output unit is implemented via at least one processor.

10. The content acquisition apparatus according to claim 1, wherein the recognition unit recognizes the marking instruction, based on a gesture shown in a captured image acquired in real time when the acquisition unit acquires the content.

11. The content acquisition apparatus according to claim 1, wherein the recognition unit recognizes the marking instruction, based on a recognition result of a sound acquired in real time when the acquisition unit acquires the content.

12. The content acquisition apparatus according to claim 1, wherein the recognition unit recognizes the marking instruction, based on a user operation acquired in real time when the acquisition unit acquires the content.

13. The content acquisition apparatus according to claim 1, wherein the recognition unit recognizes the marking instruction, based on a change in acceleration acquired in real time when the acquisition unit acquires the content.

14. A non-transitory computer-readable storage medium having a program stored therein, which when executed by a computer causes the computer to execute a method, the method comprising:
acquiring content;
recognizing a marking instruction when the content is acquired; and
providing, when the marking instruction is recognized to be a first bookmark instruction, a bookmark at a corresponding time to the acquired content so as to be a bookmarker for when the content is reproduced, and providing, when the marking instruction is recognized to be a second bookmark instruction, the bookmark at the corresponding time to the acquired content and switching an operation mode of an acquisition unit that acquires the content.

15. A content acquisition method comprising:

acquiring content;

recognizing a marking instruction when the content is acquired; and providing, when the marking instruction is recognized to be a first bookmark instruction, a bookmark at a corresponding time to the acquired content so as to be a bookmarker for when the content is reproduced, and providing, when the marking instruction is recognized to be a second bookmark instruction, the bookmark at the corresponding time to the acquired content and switching an operation mode of an acquisition unit that acquires the content.

\* \* \* \* \*